UNITED STATES PATENT OFFICE.

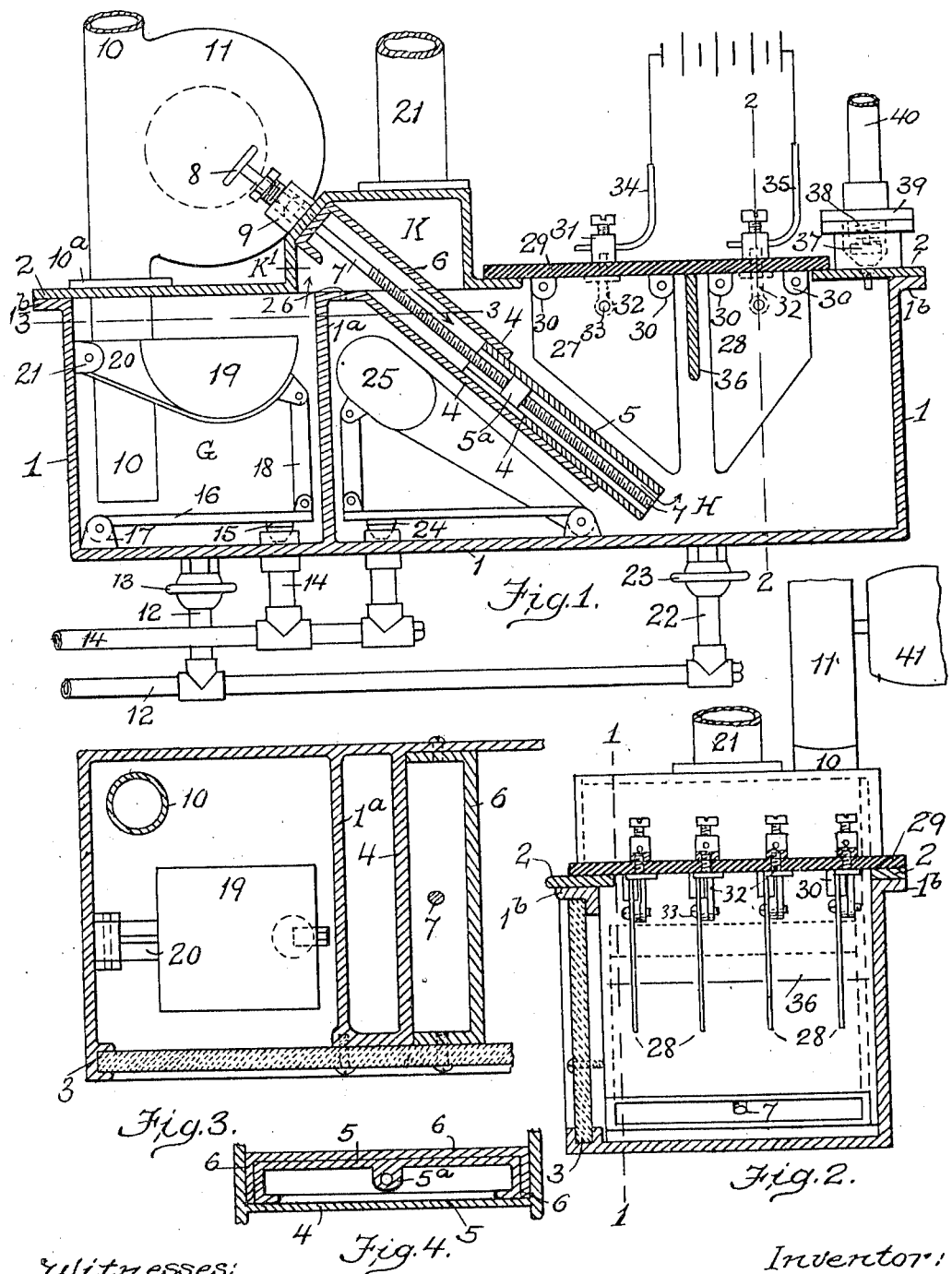

ANSON K. CROSS, OF WINTHROP, MASSACHUSETTS.

PROCESS OF PURIFYING AIR.

996,705.

Specification of Letters Patent. Patented July 4, 1911.

Application filed December 13, 1910. Serial No. 597,136.

*To all whom it may concern:*

Be it known that I, ANSON K. CROSS, of Winthrop, in the county of Suffolk and State of Massachusetts, have invented certain new and useful Improvements in Processes of Purifying Air, of which the following is a specification.

My invention has for its object, first, the purification of air fouled by dust and other foreign substances by passing the air through water, and second the addition to this purified air of as much oxygen as may be desirable.

I am aware that air is now purified by passing it through water, and that oxygen is added to air by bringing the air in contact with the electrodes of various machines, and also by the use of phosphorus and other chemicals, but I believe that air has never been purified by passing it through water and by means of electrolysis adding to the amount of oxygen contained in the air a certain percentage of oxygen extracted from the water. Though the washing of the air is old, and also the production of oxygen by electrolysis, the combination of these two methods constitutes, I believe, an entirely new process on which I am entitled to a basic claim, for many different machines may be constructed in which the air may be washed by forcing it through water and then oxygenated by adding to it the oxygen which collects at the positive pole in the process of electrolysis.

My invention consists in the use of an airtight box or chamber adapted to hold water and provided with means for forcing a stream of air through the water and out through a pipe by means of which the pumped air may be conducted wherever it is desired. In addition to this method of purifying air which is in common use, I provide means for producing oxygen by electrolysis of the water and of adding it to the purified air, thus making it possible to provide pure air in public buildings and conveyances and other places where foul air is now a danger to the health of the public.

I attain the objects of my invention in a simple way by the mechanism illustrated in the accompanying drawings in which—

Figure 1 is a longitudinal section taken near the front wall of the machine on the line 1—1 of Fig. 2. Fig. 2 is a cross-section
55 taken on line 2—2 of Fig. 1. Fig. 3 is a horizontal section on line 3—3 of Fig. 1.

Fig. 4 is a cross-section through the adjustable pipe 5 for conveying the air stream from the first compartment to the second.

The same reference characters indicate the same parts in all the figures.

The body of the machine consists of a suitable box or casing 1 having a partition 1ª dividing it into two separate compartments G and H, H being about twice as large as G. Near the partition 1ª the cover 2 is extended upward to form an air chamber K. The top edge of the case 1 has a flange 1ᵇ to which the cover 2 may be screwed. The walls of the chamber may be cast in one piece of metal or glass. I prefer, however, to have at least the front wall of the chamber of glass in order that the action within the box may be visible. In this case the glass front must be securely cemented in place, preferably in a groove 3 cast in the bottom and end pieces.

The cover 2 should be screwed to the flanges 1ᵇ with rubber strips between the two parts, so as to produce an air tight joint. An inclined partition plate 4 may be formed in continuation of the partition 1ª, or it may be formed separately and screwed to 1ª and the side walls of the box. A parallel plate 6 is fastened above plate 4 to the side walls of the chamber and to the cover 2. In the space between plates 4 and 6 a sliding tube rectangular in section is adapted to move by means of a bolt 7 threaded to the nut 5ª and passing out through the cover 2 and adapted to be turned by the wheel 8. This bolt has a collar upon its upper end which is held in the packing box 9.

Air is admitted to the chamber G by means of a pipe 10 which extends nearly to the bottom of the chamber. This pipe has a collar 10ª by which it is secured to the cover 2. Connected to the pipe 10 is a suitable fan by which air may be forced through the pipe 10 into the chamber G. Water is admitted to this chamber from the pipe 12; its flow may be regulated by the stop cock 13. In practice I prefer to have a small stream of water flowing into the chamber all the time, and to keep the water at uniform height in the chamber, I provide an outlet pipe 14, which is closed by a valve 15. This valve is secured at the end of a lever 16 which is pivoted between ears 17 rising from the bottom of the chamber. A link 18 is pivoted to the outer end of the lever 16 and to a float 19. This float is secured to an arm 20 which is pivotally secured between ears 21 which extend from the side wall of the chamber. When the water rises in the chamber G it lifts the float and opens the discharge valve 15, thus keeping the water near one level. Instead of the fan or blower 11, any form of pump to force the air through pipe 10 may be used.

Communication is made from the chamber G with the chamber K through chamber K', formed above the cover 2, through the air space between plates 4 and 6 and the adjustable tube 5, and through the chamber H, air which enters the chamber G is forced through the water which it contains and then through pipe 5 and through the liquid which is contained in chamber H. Leaving the lower end of pipe 5 the air at once rises through the liquid into chamber K and then passes into the distributing pipe 21. The chamber H is filled with water by means of the pipe 22, the flow being regulated by the stop cock 23. The height of the water in the chamber is regulated by a valve 24 and a float 25 arranged as are those in the chamber G. To admit air about the float 25 a small hole 26 is drilled in the top of the partition 1ª. When the sliding tube 5 is fully drawn up into its retaining chamber the air will pass from its lower end into the chamber H without being forced through the liquid in the chamber H. The lower the tube 5 is placed in the water, the more water in the second chamber the air must come in contact with before it escapes into the chamber K. When the tube is depressed as far as possible, the air ascends by the positive poles 27 upon which the oxygen collects and thus collects the oxygen as it is formed. When fully depressed, a portion of the air will pass into the farther part of the chamber H and rise by the negative poles 28, thus assisting in the discharge of the hydrogen which collects upon these poles.
The positive and negative poles 27 and 28 I prefer to make of platinum. They are attached to a hard rubber plate 29 which is screwed to the cover 2 which has a rectangular opening in it large enough to admit the electrodes to the chamber H. The platinum plates are held between ears 30 depending from the plate 29 by means of screws passing through the ears and the plates. The electric current is applied to the plate 27 by means of a wire 34 held in a metal nut 31 which is secured to the plate 29 by a screw 32 having a collar bearing against the under side of the plate 29. The outer end of this screw 32 is enlarged and held to the plate 27 by a screw 33 passing through the plate and into the screw 32, a washer being placed between the electrode and the screw 32. The current leaves the negative pole by the wire 35, which is connected to the plate 28 in the same way as the positive wire to the plate 27. The hydrogen gas collects at the negative plate 28 and then rises into the air space above. To keep this gas from mingling with the oxygen a partition 36 is cast to the back plate of the chamber H and screwed to the front plate and to the plate 29 so as to form a tight joint. A valve 37 is fitted to the bottom of a small chamber 38 formed upon the top plate 2 with a pressure spring above it adjusted to give the same tension as that produced by the air in the chamber K. The chamber 38 has a covering plate 39 and to this plate a pipe 40 is attached to carry away the hydrogen gas.

Instead of attaching the blower or pump to the inlet pipe it may be connected to the outlet pipe 21. In place of pure water an acidulated water formed by the addition of a little sulfuric or hydrochloric acid is preferable for the process of electrolysis.
When this is to be used, a separate supply pipe must be provided for the liquid supply to each chamber G and H, or separate means of admitting acid to the water as desired may be provided. In place of the electric motor 41 by which the fan is run, power may be supplied by a belt or gears or any device commonly used for the transmission of power.

The device shown is specially intended for use in private dwellings, but the idea may be applied in many different ways. Where water power is to be had, the purifying and oxygenating of the air may be done most cheaply, and the air then conducted by pipes as many miles as may be necessary, and it may then be carried into dwellings as is gas or water. In public conveyances the water required may be changed occasionally and the power be obtained from storage or other batteries when direct current is not available. In public and other buildings the air may be cooled in the summer time and warmed in the winter time by suitable means, either in the chamber or without, as desired, and thus an ideal system of ventilating and heating is possible at slight expense over the existing methods which at best simply warm or cool and purify the air without adding to its percentage of oxygen. The number of electrodes may be increased or diminished at will; also the strength of the current of electricity and by modifying one or all of these, it is possible to give any desired percentage of oxygen to the air. This makes my invention especially valuable in hospitals and for all invalids, as well as for all compelled to live in the large cities whose air is always more or less lacking in oxygen, and contaminated by smoke, dust and germs.
So far as I am aware, my invention combines for the first time the steps of washing the air and regenerating it by means of nascent oxygen in a single method and by means of a single apparatus, the same water if desired serving both as the means for washing the air and as the electrolyte which furnishes the oxygen in a form enabling it to be taken up by the air at the same time that the air is washed. Although both the principles of purifying air by washing with water and of producing oxygen by electrolysis of water have long been known, yet prior to my invention, no one has conceived the idea of combining these principles in a single process having for its object the purifying and vitalizing of the air. In other words the idea of simultaneously passing water and an electric current through the liquid electrolyte containing oxygen, whereby the liquid removes impurities from the air by mechanical action, and supplies oxygen by the electrolytic action to the air, is novel with me.

I claim,—

1. The method of treating a gas, comprising passing the gas through a liquid in which oxygen and another gas are being produced by electrolysis in such a manner that the oxygen is added to the gas being oxygenated while the other gas is kept from mingling therewith.

2. The method of purifying air comprising passing it through a suitable liquid electrolyte and adding to the air oxygen which is formed by electrolysis of the liquid performed in such a manner that the oxygen is conducted into the air current while the other gaseous constituent of the electrolyte is prevented from mixture with the air.

3. In a machine for purifying air, suitable means for producing oxygen by electrolysis of water or any suitable liquid, means for separating the oxygen from the hydrogen, and means for forcing the air through the liquid and causing it to mix with the oxygen while the hydrogen is separately conducted from the machine.

4. In a machine for purifying air, suitable means for causing the air to pass through water in order that impurities may be retained in the water, combined with suitable means for electrolyzing the water through which the air passes, whereby to add oxygen to the purified air, and means for preventing the hydrogen from mixing with the air.

5. In a machine for purifying air, an air-tight receptacle adapted to contain water or other liquid, means for forcing a stream of air through the water, means for producing oxygen by electrolysis of the liquid and suitable means for conducting the air through only that part of the receptacle where the oxygen is produced, whereby the oxygen is mixed with the air, while the hydrogen is kept separate from the air.

6. In a machine for purifying air, suitable means for causing a stream of air to pass through a body of water to remove impurities from the air, means for decomposing the water by electrolysis, and suitable means for discharging separately the hydrogen and retaining the oxygen where it may mingle with the air current.

7. In a machine for purifying air, a receptacle having two separate compartments adapted to hold water or other fluids, electrodes arranged in the different compartments for decomposing the water and separately collecting the gases, means for causing a stream of air to pass through the water and then to pass through the compartment containing oxygen and take up oxygen which is there formed by electrolysis, and means for separately discharging the hydrogen formed by the electrical action.

8. A process of purifying and oxygenating air which comprises forcing air through any liquid adapted to wash and purify the same, and formed in part of oxygen, and at the same time subjecting this liquid to electrolysis to produce oxygen separate from its other constituents and finally separating the other constituents from the oxygen, and allowing the oxygen to mingle with the purified air.

9. A process of purifying and oxygenating air consisting of forcing air through a closed chamber containing a liquid adapted to wash and purify the air, then forcing this purified air through another closed chamber containing a liquid adapted to produce oxygen and hydrogen by electrolysis, and at the same time producing these gases by electrolysis of the liquid, and separating the hydrogen from the oxygen, allowing the oxygen to mingle with the purified air and keeping the hydrogen away from the air.

In testimony whereof I have affixed my signature, in presence of two witnesses.

ANSON K. CROSS.

Witnesses:
F. R. ROULSTONE,
P. W. PEZZETTI.